Figure 1:
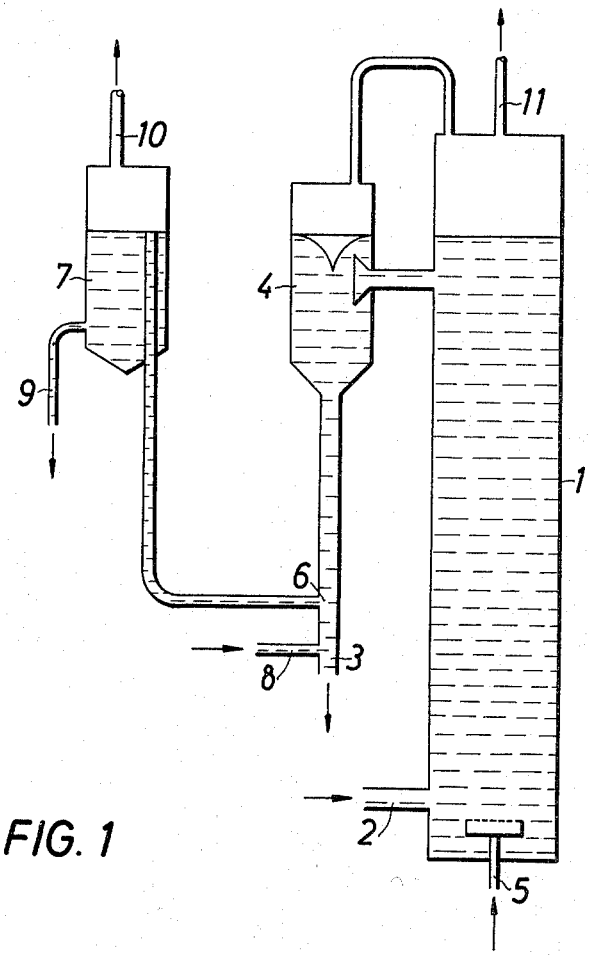

Nov. 15, 1966　　　　C. WEGNER ETAL　　　　3,285,976
PROCESS FOR THE CONTINUOUS PRODUCTION
OF PROPYLENE CHLOROHYDRIN
Filed June 11, 1963　　　　　　　　　　　2 Sheets-Sheet 1

INVENTORS
CHRISTIAN WEGNER, EDGAR MUSCHELKNAUTZ, OTTO
JÜBERMANN, HANS LE BLANC
BY
Burgess, Dinklager & Sprung
ATTORNEY Nov. 15, 1966    C. WEGNER ETAL    3,285,976
PROCESS FOR THE CONTINUOUS PRODUCTION
OF PROPYLENE CHLOROHYDRIN
Filed June 11, 1963    2 Sheets-Sheet 2

INVENTORS
CHRISTIAN WEGNER, EDGAR MUSCHELKNAUTZ, OTTO
JÜBERMANN, HANS LE BLANC

BY Burgess, Dinklage & Sprung
ATTORNEY 3,285,976
PROCESS FOR THE CONTINUOUS PRODUCTION OF PROPYLENE CHLOROHYDRIN
Christian Wegner, Heisterbacherrott, Edgar Muschelknautz, Leverkusen, Otto Jübermann, Opladen-Quettingen, and Hans Le Blanc, Dormagen, Germany, assignors to Farbenfabriken Bayer Aktiengesellschaft and Erdölchemie Gesellschaft mit beschrankter Haftung, both of Leverkusen, Germany, a corporation of Germany
Filed June 11, 1963, Ser. No. 287,098
Claims priority, application Germany, June 12, 1962, F 37,045
2 Claims. (Cl. 260—634)

This invention relates to a process for the production of propylene chlorohydrin and to an apparatus suitable in such production process.

It is known that olefine chlorhydrins can be prepared by reacting olefines with a hydrochloric acid solution of hypochlorous acid, such as that obtained by introducing chlorine into water. In the preparation of propylene chlorohydrin, undesirable side products such as dichloropropane, dichlorodiisopropyl ether and others are formed due to secondary reactions occurring (Ferrero etc., Ind. Chim. Belge 19 (1954), 2, page 113).

For this reason, various types of reactors have been proposed for the production of propylene chlorohydrin, all these reactors comprising a spatial separation of chlorine-dissolving zone and reaction zone. The two zones can be arranged one above the other in one tower, staggered relative to one another in two towers or be arranged in juxtaposition. They must be so inter-connected that the reaction liquid can circulate through both zones. The circulation of the liquid in the reactor is produced for example by introducing an excess of propylene or a propylene diluted with inert gases and thereby producing an ascending movement in the reaction zone. The gases thus discharging at the top of the reaction zone can be circulated by means of a circulation compressor and be completely or partially reintroduced. With the continuous production of propylene chlorohydrin, a part of the solution is constantly removed from the reactor, and this is replaced by fresh water and thus the concentration of propylene chlorohydrin is kept constant.

In order to produce a good yield of propylene chlorohydrin with a high reactor loading, a chlorine concentration of 0.9 to 1.5 g. of $Cl_2$ per litre of liquid has proved expedient. This relatively low chlorine concentration can however only be obtained by having a high liquid circulation, but this simultaneously involves a large quantity of waste gas as the top of the reaction zone. The waste gas usually contains a considerable quantity of propylene, this being between 10 and 90% depending on the propylene concentration on entering the reaction zone, and some of this propylene is entrained by the circulating water and thus enters the chloride-dissolving zone in which it forms undesired by-products such as propylene dichloride.

It is an object of the present invention to provide an improved process for the propylene chlorohydrin. A further object is to provide a process for the production of propylene chlorohydrin wherein the formation of side products is avoided. Further objects will appear hereinafter. It has now been found that these objects are attained and that this formation of side-products in the continuous production of propylene chlorohydrin by reacting propylene with aqueous hypochlorous acid can be substantially avoided if the gaseous compounds contained in the reaction solution after leaving the reaction zone are separated from the reaction solution preferably by means of a gas-liquid separator in the form of a cyclone and the remaining reaction solution is further utilized in the usual way.

The process according to the invention is explained by reference to an example of an arrangement for the production of propylene chlorohydrin, as shown in FIGURE 1.

An aqueous hypochlorous acid solution is introduced into a reaction tower 1 through a pipe 2. The acid can for example be prepared in another reaction tower by introducing chlorine into water. Propylene is also introduced into the reaction tower 1 through a pipe 5. Excess propylene and inert gases leave the reaction tower through a pipe 11. In the upper part of the reaction tower 1, the reaction solution is removed by way of a cyclone 4 from the reaction tower. In the cyclone 4, the reaction solution is separated from entrained gases. The reaction solution is then discharged from the bottom portion of the cyclone. Some of this reaction solution is extracted at 6 and fed by way of a level regulator 7 and a pipe 9 for working up. The cyclone 4 and the reaction tower 1 can be de-aerated through the pipe 11. The level regulator 7 can be de-aerated through the pipe 10. The larger part of the reaction solution leaving the cyclone 4 is again supplied to a chlorine-dissolving tower through the pipe 3, after fresh water has been introduced through a pipe 8.

Instead of the arrangement just described, it is of course also possible to use any other usual arrangement in which for example the working up of the reaction solution after leaving the cyclone can be effected in any other desired manner.

Figure 2A:
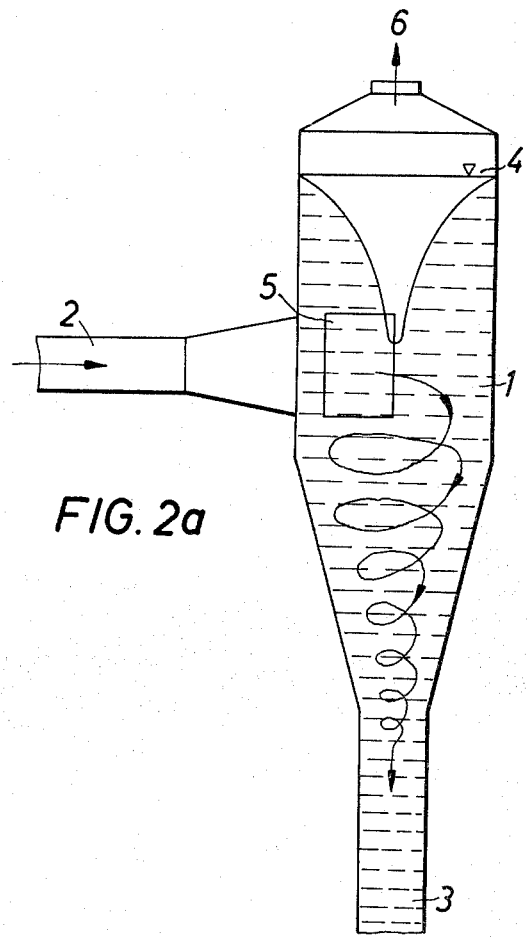
Figure 2B:
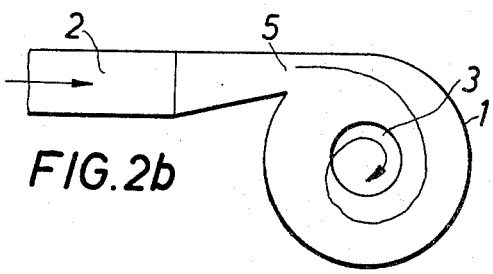

The gas-liquid separator is explained by reference to FIGS. 2a and 2b, which show one embodiment of the cyclone. FIG. 2a is a vertical section and FIG. 2b a horizontal section through the cyclone.

The principle is based on the fact that the liquid-gas mixture is supplied tangentially to a vertically disposed, symmetrical vessel 1 which tapers gradually downwards through a horizontal pipe 2 at the upper end, advantageously through a rectangular slot 5, and all the liquid is resupplied through a downwardly extending long gravity pipe 3 to the chlorine-dissolving zone or is worked up. As in cyclones, a vortex with a large radial pressure drop is set up in the field of centrifugal force in the separation vessel, and the gradient thereof can be made larger by one to two orders of magnitude than in the field of gravitational force by suitably selected dimensions. Under the action of the pressure drop, the gas bubbles migrate towards the axis, ascend at this point with the rearwardly flowing dead water core of the flow and thus enter the gas space above the circulating liquid. Thus, the reaction solution containing gaseous compounds is subjected to a vortex motion in a confined zone whereby the gas is separated out. It is important in this case to maintain a liquid level 4 by means of a level regulator at a predetermined height above the inlet 5, so that the bubbles ascending in the dead water core can easily discharge into the gas space and thereby be completely separated out without the circulating liquid masses being too strongly retarded, and thus substantially reducing the radial pressure drop and impairing the separation effect. The gases which separate out leave the cyclone through pipe 6.

The process according to the invention enables the amount of propylene dichloride formed to be very greatly reduced.

*Example*

The reactor consists of two towers, namely, a chlorine-dissolving tower and a reaction tower 1 which are interconnected by the circulation pipes 2 and 3. In the circulation pipe from the reaction tower to the chlorine-dissolving tower, a cyclone 4 is installed for separating out the gasses entrained by the liquid.

Propylene gas with a content of 40 to 95% of propylene is introduced into the base of the reaction tower through the pipe 5 and chlorine gas is introduced into the chlorine-dissolving tower. The chlorine forms with the water a mixture of hypochlorous acid and hydrochloric acid and the hypochlorous acid reacts with propylene to form propylene chlorohydrin. The propylene chlorohydrin is removed as 3–7% solution from the circulation below the cyclone at 6 and fed through a level regulator 7 and the pipe 9 for working up. A corresponding quantity of fresh water is supplied to the reactor through the pipe 8 into the circulation pipe to the chlorine tower.

In the following table, the yields of the reaction of propylene with hypochlorous acid in reactors with and without a cyclone for separating out propylene gas are compared. The reactors have the same dimensions in both cases.

| Input | Without cyclone | | With cyclone | |
|---|---|---|---|---|
| Chlorine, kg./h | 600 | | 600 | |
| Propylene 50%, m.³/h. at n.t.p | 390 | | 390 | |
| Water, m.³/h | 12.9 | | 15.1 | |
| Yield: | | | | |
| Propylene chlorohydrin, m.³/h | 13.6 | 4.5% | 15.8 | 4.5% |
| and | | | | |
| Propylene chlorohydrin (100%) | 614 | | 711 | |
| =Percent, calculated on chlorine introduced | 76.9 | | 89.0 | |
| Crude dichloropropane, kg./h | 142 | | 60 | |
| =Percent, calculated on chlorine introduced | 14.9 | | 6.3 | |

We claim:

1. In the process for the continuous production of propylene chlorohydrin from propylene and aqueous hypochlorous acid, in which a part of the reaction solution is worked up to propylene chlorohydrin and the remainder is recycled to the reaction zone wherein the reaction of propylene and aqueous hypochlorous acid takes place, the improvement which comprises separating the gaseous compounds, including dissolved propylene, from the reaction solution after it leaves the reaction zone and prior to recycling said reaction solution to the reaction zone.

2. Process as claimed in claim 1 which comprises separating the gaseous compounds from the reaction solution by subjecting said reaction solution to a vortex motion in a confined zone.

References Cited by the Examiner

UNITED STATES PATENTS

| 1,253,615 | 1/1918 | McElroy | 260—634 |
| 2,007,168 | 7/1935 | Kautter | 260—634 |
| 2,130,226 | 7/1936 | Britton et al. | 260—634 |
| 2,794,832 | 6/1955 | Rietema | 260—634 |

LEON ZITVER, *Primary Examiner.*

M. B. ROBERTO, J. E. EVANS, *Assistant Examiners.*